United States Patent [19]

Park

[11] Patent Number: 5,701,384

[45] Date of Patent: Dec. 23, 1997

[54] DIFFERENT TRACK SEARCHING METHOD FOR VIDEO COMPACT DISC RECORDING/REPRODUCING SYSTEM AND APPARATUS THEREOF

[75] Inventor: Chan-Sou Park, Ch'ungch'ognam-Do, Rep. of Korea

[73] Assignee: Daewoo Electronics Co., Ltd., Seoul, Rep. of Korea

[21] Appl. No.: 580,442

[22] Filed: Dec. 27, 1995

[30] Foreign Application Priority Data

Dec. 30, 1994 [KR] Rep. of Korea .................... 94-39387

[51] Int. Cl.$^6$ ............................................. H04N 5/781
[52] U.S. Cl. .................... 386/70; 386/82; 386/126; 386/111
[58] Field of Search .................... 386/33, 45, 69, 386/70, 82, 109, 111, 112, 105, 106, 125, 126; 360/8, 27, 72.1, 72.2, 73.03, 78.04, 78.14; 369/32, 44.28; H04N 5/76, 5/92, 5/781, 5/917, 7/26

[56] References Cited

U.S. PATENT DOCUMENTS

| | | | |
|---|---|---|---|
| 5,063,550 | 11/1991 | Watari et al. | 386/125 |
| 5,128,775 | 7/1992 | Suzuki et al. | 386/105 |
| 5,177,728 | 1/1993 | Otsubo et al. | 386/125 |
| 5,257,253 | 10/1993 | Otsubo et al. | 386/105 |
| 5,321,677 | 6/1994 | Kamijima | 369/33 |
| 5,521,898 | 5/1996 | Ogasawara | 386/126 |
| 5,552,896 | 9/1996 | Yosbida | 386/125 |
| 5,596,564 | 1/1997 | Fukushima et al. | 386/70 |

*Primary Examiner*—Thai Tran
*Attorney, Agent, or Firm*—Beveridge, DeGrandi, Weilacher & Young LLP

[57] ABSTRACT

A method capable of automatically searching a different track such as compact disk-digital audio according to whether or not a CD-ROM XA synchronization signal is detected for a video compact disc in the video compact disc for a the video compact disc recording/reproducing system and apparatus thereof. The different track method and apparatus discriminates the kind of the loaded optical disc by reading TOC data recorded on the lead-in area of the optical disc, in case of the video compact disc, checks if a different track is contained in the video compact disc such as a CD-DA track in accordance with whether or not the synchronous signal for the video compact disc is detected easily. Therefore, not only an audio compact disc, a compact disc graphics disc, a video compact disc not also a video compact disc having a CD-DA track can be easily reproduced.

3 Claims, 4 Drawing Sheets

DIFFERENT TRACK SEARCHING METHOD FOR VIDEO COMPACT DISC RECORDING/REPRODUCING SYSTEM AND APPARATUS THEREOF

BACKGROUND OF THE INVENTION

1. Field of the Invention

The present invention relates to a video compact disc (hereinafter referred to as "V-CD") recording/reproducing system, and more particularly, to a method capable of automatically searching a different track such as a compact disc-digital audio (hereinafter referred to as "CD-DA") according to whether a CD-ROM XA (extended architecture) synchronization signal is detected for V-CD in V-CD for the V-CD recording/reproducing system and apparatus thereof.

2. Description of the Prior Art

In the area of optical discs, compact discs are widely used as information recording media in which a large quantity of audio information is recorded. In information recording media in the form of a disc, an audio compact disc (hereinafter referred to as "CD") was developed for the first time. A compact disc graphics (hereinafter referred to as "CDG") disc on which graphic information and audio information are recorded, and V-CD (hereinafter referred to as "V-CD") on which motion image information and audio information are recorded are widely used.

A V-CD recording/reproducing system is used as a composite product which is capable of reproducing not only V-CD but also audio CD and CDG. In order to record different information on the discs, different information processing methods inherent to each of the discs are applied.

At first, audio information data recorded on a CD may be reproduced by using program data recorded in P and Q channels. Information data recorded on CDG may be reproduced by using audio information data recorded in P and Q channels and graphic formation data recorded in R to W channels. Since audio information data and video information data recorded on V-CD are compressed and recorded by an MPEG algorism during recording, these may be reproduced by decoding the compressed audio/video information data via MPEG audio/video decoder during the playback operation.

The V-CD also includes different tracks on which different information data are recorded having a different data format from CD-ROM XA track on which general V-CD information data are selectively recorded. For example, at least one track is selectively allotted as a CD-DA track which is located inside a final track on a V-CD wherein MPEG audio/video signals have been processed and recorded by the MPEG algorism. In a case where a CD-DA track is allotted on the V-CD, it is necessary to check the allotted state of CD-DA track and reproduce information data appropriately in response to the checking. U.S. Pat. No. 5,321,677 describes an embodiment of searching a method for various kinds of information data recorded in different tracks of a V-CD as described above.

In the V-CD having both an MPEG format track and a different track such as CD-DA track on which information data are recorded, according to a conventional method of searching different tracks, discrimination of the CD-DA track is performed by storing primary volume descriptor (PVD) in an additional storing place, e.g. static random access memory (SRAM). However, the conventional method has the problems in that the course of searching different tracks is complicated and that it wastes time.

SUMMARY OF THE INVENTION

Therefore, a first object of the present invention is to provide a method capable of automatically searching different tracks selectively allotted in a V-CD according to whether or not a CD-ROM XA synchronization signal is detected for the V-CD for a V-CD recording/reproducing system.

A second object of the present invention is to provide an apparatus capable of automatically searching different tracks selectively allotted in a V-CD according to whether or not a CD-ROM XA synchronization signal is detected for the V-CD for a V-CD recording/reproducing system.

In order to achieve the above-mentioned first object of the present invention, there is provided a method for searching different tracks in video compact disc recording/reproducing system using an optical pickup, the method comprising the steps of:

reading table-of-contents data recorded in a lead-in area of an optical disc which is loaded in the video compact disc recording/reproducing system;

deciding whether or not the optical disc is a video compact disc based on the read table-of-content data on the video compact disc, to read out information of video compact disc based on a track number and a track reproducing time information contained in the table-of-content data and to move the optical pickup to a final track in the video compact disc and read out data recorded on the final track, when the optical disc is the video compact disc; and deciding whether or not a CD-ROM XA synchronous signal for the video compact disc is detected in the read-out data from the final track, when the CD-ROM XA synchronous signal is detected, the final track is decided as a track on which MPEG audio/video signal are recorded by a MPEG processing and a processing audio/video signal against the video compact disc, and when the CD-ROM XA synchronous signal is not detected, the final track is decided as the different track so that the optical pickup is moved to an inside track of the final track to read out data recorded on the inside track; and deciding whether or not a CD-ROM XA synchronous signal for the video compact disc is detected in the read-out data from the inside track, when the CD-ROM XA synchronous signal is detected, the inside track is decided as a track on which MPEG audio/video signal are recorded by a MPEG processing and a processing audio/video signal against the video compact disc, and when the CD-ROM XA synchronous signal is not detected, the inside track is decided as the different track so that the optical pickup is moved to an inside track of the final track to return to the step reading out data recorded on the inside track.

In order to accomplish the above second object of the present invention, there is provided an apparatus for searching different tracks in a video compact disc recording/reproducing system, the apparatus comprising:

a data reading means for reading recorded information data from an optical disc which is loaded in a video compact disc recording/reproducing system, to output an audio/video data reading signal;

a preamplifier for amplifying the audio/video data reading signal which is supplied by the data reading means to output an amplified signal;

a digital signal processor for digital-processing the amplified signal from the preamplifier to output a first digital signal, a second digital signal, a third digital signal and a fourth digital signal;

a CDG encoder for encoding the first digital signal from the digital signal processor to output an encoded CDG signal;

a first D/A converter for converting the second digital signal and the fourth digital signal from the digital signal processor into a first analog signal and a second analog signal, respectively;

an MPEG processing section for processing the third digital signal from the digital signal processor by an MPEG algorism to output an MPEG audio/video signal;

a switch for switching between the CDG signal from the CDG encoder and the MPEG video signal from the MPEG processing section to outputs a video signal for a displaying device, and for switching between the first analog signal and the second analog signal from the first D/A converter and the MPEG audio signal from the MPEG processing section to output an audio signal for a sound generation device; and a control section for controlling an operation of the data reading means, the digital signal processor, the MPEG processing section and the switch, for discriminating a kind of the optical disc which is loaded based on table-of-content data of the optical disc, the table-of-content being supplied through the digital signal processor from the data reading means, and for searching whether the different track is allotted on the video compact disc according to whether or not a CD-ROM XA synchronous signal for the video compact disc is detected when the optical disc is the video compact disc.

Preferably, the first digital signal is a compact disc graphics signal, both the second digital signal and the first analog signal are an audio compact signal, the third digital signal is an MPEG audio/video signal for the video compact disc, the fourth digital signal and the second analog signal are a CD-DA track signal of the video compact disc.

The different track searching method and apparatus decides what kind of disc is the loaded optical disc by reading TOC data recorded on lead-in of an optical disc, in case of V-CD, checks different rack is contained in the V-CD such as CD-DA track in accordance with whether the synchronous signal for V-CD is detected easily. Therefore, the present invention may be used to reproduce not only an audio CD, a CDG, a V-CD not also a V-CD having a CD-DA track.

BRIEF DESCRIPTION OF THE DRAWINGS

The above objects and advantages of the present invention will become more apparent by describing in detail a preferred embodiment thereof with reference to the attached drawings, in which.

DESCRIPTION OF THE PREFERRED EMBODIMENT

A description will be given below in detail, with reference to the accompanying drawings, of the mechanical structure, the circuitry configuration, and the operation of a different track researching method for a V-CD recording/reproducing system and an apparatus thereof according to an embodiment of the present invention.

Figure 1:
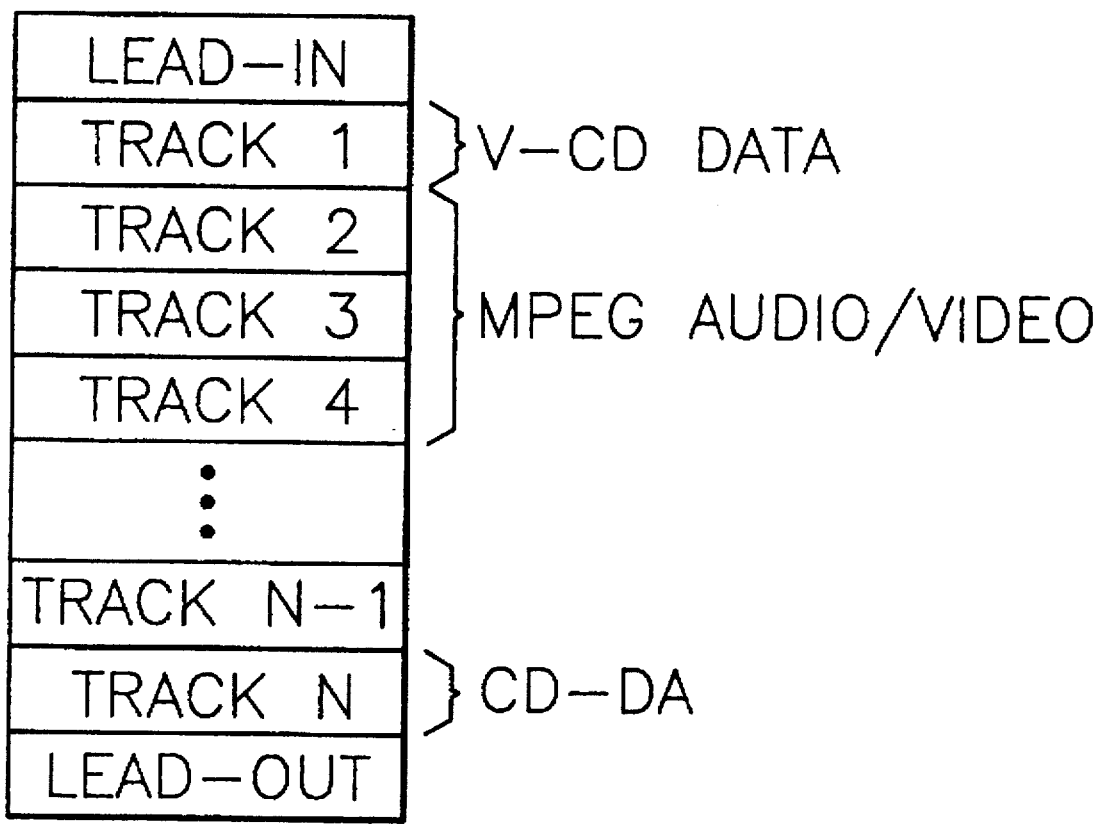
FIG. 1 is a schematic diagram for explaining the data format of a V-CD which can be used in the present invention.

FIG. 1 is a schematic diagram for explaining the data format of V-CD which can be used in the present invention. With reference to FIG. 1, generally, a V-CD has a lead-in area in which the table-of-contents (hereinafter referred to as "TOC") data are reproduced by a V-CD recording/ reproducing system, a program area having at least one track on which MPEG audio/video data are recorded and at least one different track such as CD-DA track and lead-out area. The program area has at least one track. A first track includes a PVD area as a V-CD data track, a Karaoke Information Area (KIA) formed in a state which the video-song information is recorded on the corresponding disc, the V-CD information area, a Segment Play Item (SPI) area and a CD-I (Interactive) application area. The MPEG audio/video data compressed by the MPEG algorism are recorded on track 2 to track N. According to one case, at least one different track may be allotted inside the track N in which the CD-DA information data such as CD-DA track are recorded.

Figure 2:
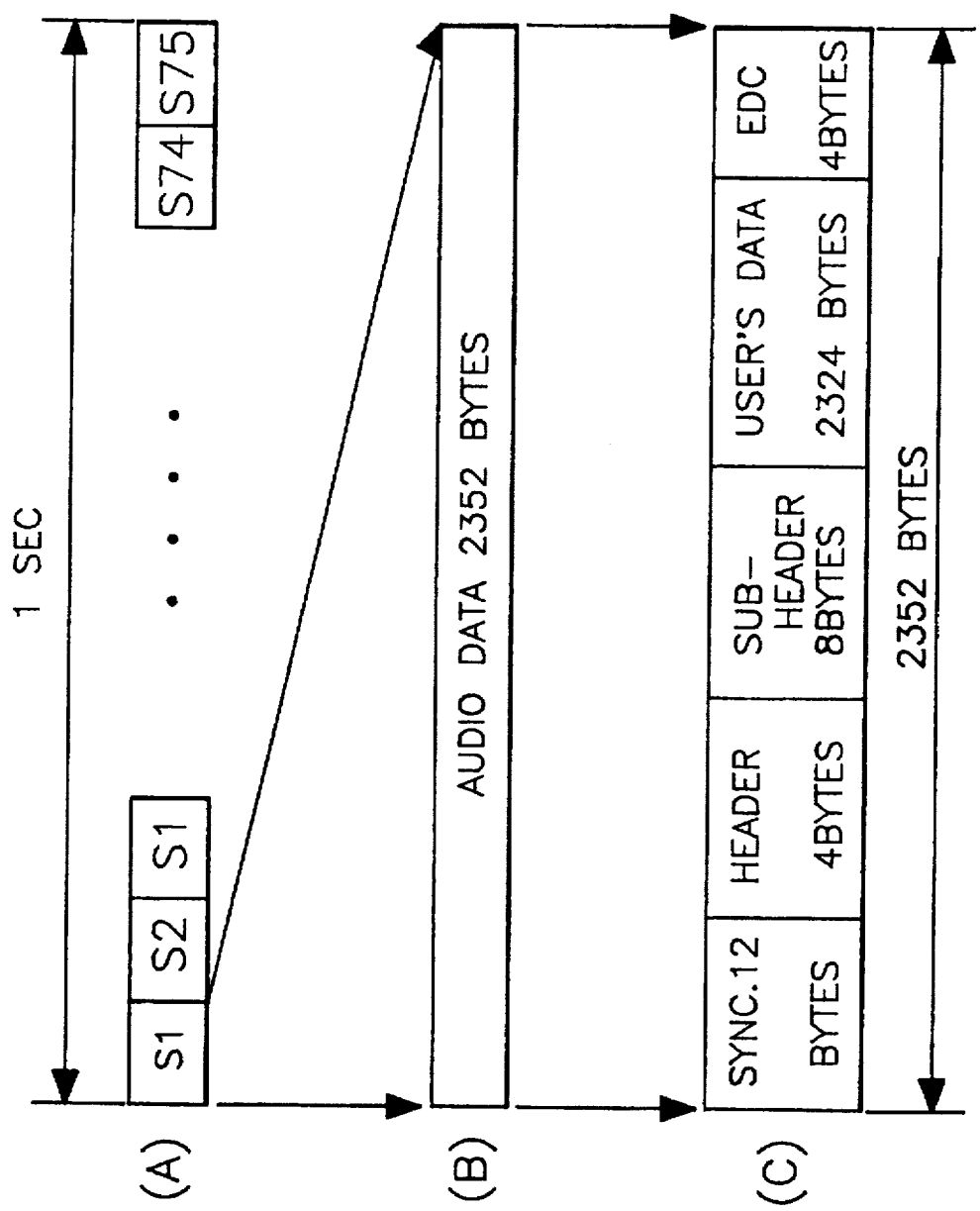
FIG. 2A is a view for illustrating the structure of a sector in a conventional CD.
FIG. 2B is a schematic diagram for illustrating the data format of the sector shown in FIG. 2A with respect to a CD-DA track.
FIG. 2C is a schematic diagram for illustrating the data format of the sector shown in FIG. 2A with respect to a CD-ROM XA track for a V-CD.

FIG. 2A illustrates the structure of a sector in a general CD. With reference to FIG. 2A, each sector of the CD is divided by 75 and reproduced for one second.

FIG. 2B is a schematic diagram for illustrating the data format of each sector shown in FIG. 2A with respect to the CD-DA track. With reference to FIG. 2B, one track of CD-DA track is composed of an audio data (2352 bytes).

FIG. 2C is a schematic diagram for illustrating the data format of each sector shown in FIG. 2A with respect to the CD-ROM XA track for the V-CD. With reference to FIG. 2C, one track of a CD-ROM XA track for the V-CD has 2352 bytes as in the CD-DA track, which is composed of a synchronous signal (12 bytes), a header data (4 bytes), a sub-header data (8 bytes), a user' data (324 bytes) and an error detection code EDC (4 bytes).

Figure 3:
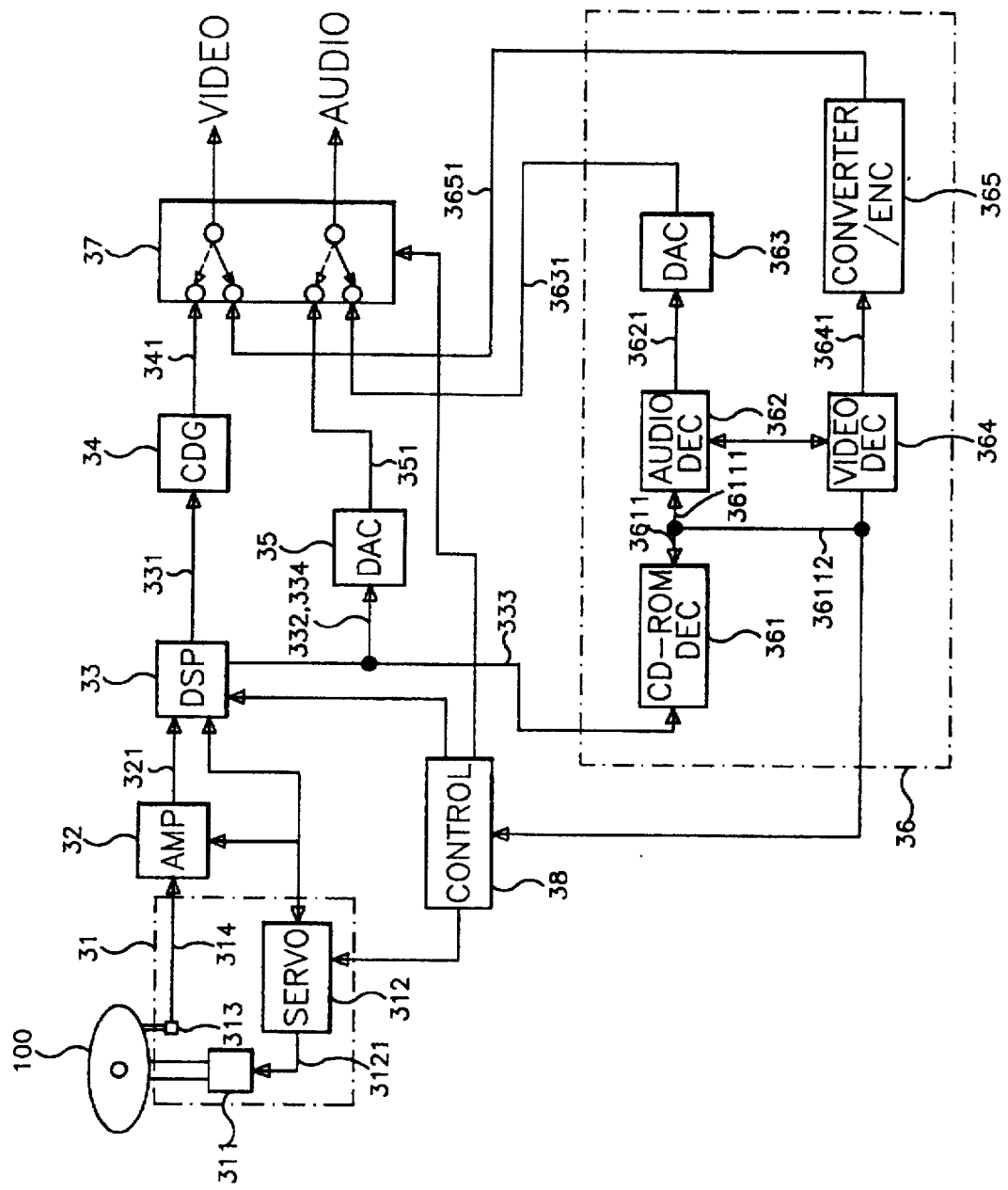
FIG. 3 is a block diagram for showing the configuration for a different track researching apparatus in a V-CD recording/reproducing system according to one embodiment of the present invention.

FIG. 3 is a block diagram for showing the configuration for different tracks researching apparatus in V-CD recording/ reproducing system according to the present invention. With reference to FIG. 3, a reference numeral 100 denotes an optical disc which is reproduced by a V-CD recording/ reproducing system. A data reading section 31 comprises a spindle motor 311, a servo circuit 312 and an optical pickup 313, which reads the recorded information data from optical disc 100 and outputs an RF MPEG audio/video reading signal 314. Spindle motor 311 rotates optical disc 100 at a constant speed under the control operation of a control section 38 to be described later, so that optical disc 100 is reproduced normally. Optical pickup 313 reads out information from the optical disc 100 which is rotated at a constant speed. Servo circuit 312 controls drive of spindle motor 411 and movements of the optical pickup 313.

A preamplifier 32 amplifies audio/video data reading signal 314 supplied from optical pickup 313 and outputs amplified signal 321.

A digital signal processor (DSP) 33 digital-processes amplified signal 321 from preamplifier 32 and outputs a CDG signal 331, an audio CD signal 332, an MPEG audio/video signal 333 recorded on the V-CD and a CD-DA signal 334 in case of a CD-DA track which is allotted in the V-CD.

A CDG encoder 34 encodes the CDG signal 331 from DSP 33 and outputs the encoded CDG signal 341.

A first D/A converter 35 converts an audio CD signal 4511 and a CD-DA track signal 334 selectively allotted in the V-CD 334 into a first analog signal 351 and a second analog signal 3511.

An MPEG processing section 36 includes a CD-ROM decoder 361, a MPEG audio decoder 362, a second D/A converter 363, an MPEG audio decoder 364 and a video signal converter/encoder 365, which processes an MPEG audio/video signal 333 of the V-CD provided from DSP 33 by the MPEG algorism and outputs a first MPEG signal 3631 and a second MPEG signal 3651. A CD-ROM decoder 361 decodes MPEG audio/video signal 333 suitable for the CD-ROM data format and outputs decoded MPEG signal 3611. MPEG audio decoder 362 decodes MPEG audio signal 36111 of CD-ROM decoded MPEG signal 3611 through CD-ROM decoder 361 in accordance with the predetermined audio synchronous clock and outputs the decoded MPEG audio signal 3621. Second D/A converter 363 analog-converts the decoded MPEG audio signal 3621 by MPEG audio decoder 361 and outputs the analog-converted MPEG audio signal 3631. MPEG video decoder 364 decodes MPEG video signal 36112 of CD-ROM decoded MPEG signal 3611 through CD-ROM decoder 361 in accordance with the predetermined video synchronous clock and outputs the decoded MPEG video signal 3641. Video signal converter/encoder 365 analog-converts the decoded MPEG video signal 3641 from MPEG video decoder 364 and encodes it to output the analog-converted/ encoded MPEG video signal 3651.

A switch 37 switch between encoded CDG signal 341 from CDG encoder 34 and analog-converted/encoded MPEG video signal 3651 from MPEG processing section 36 to outputs a video signal for a displaying device, and switch between the first signal 351 and second signal 3511 from first D/A converter 35 and the analog-converted MPEG audio signal 3631 from MPEG processing section 36 to output an audio signal for a sound generation device.

A control section 38 controls the operation of data reading section 31, DSP 33, MPEG processing section 36 and switch 37, discriminates the kind of optical disc 100 which is loaded based on the TOC data of optical disc 100, the TOC data are supplied through DSP 33 from data reading section 31, and searches whether the different track is allotted on the V-CD according to whether or not a CD-ROM XA synchronous signal for the V-CD is detected when the optical disc 100 is the V-CD. The TOC data are supplied through DSP 33 from data reading section 31.

A description will be given below in detail to the operation of different tracks searching apparatus for a V-CD recording/reproducing system as mentioned above.

At first, an optical disk 100 is loaded on the V-CD recording/reproducing system 4 by a user. Then, spindle motor 311 rotates optical disc 100 under the control of control section 38 on the basis of spindle control signal 3121 from servo circuit 312 of data reading section 31.

Accordingly, optical pickup 313 reads TOC data recorded at the lead-in area of optical disk 100 and outputs RF TOC reading signal 314.

Then, preamplifier 32 amplifies TOC reading sinal 314 from optical pickup 313 and outputs amplified TOC signal 321. Then, DPS 33 processes an amplified TOC signal 321 into a digital TOC signal. Then, control section 38 checks whether SPEC of A0 in Q channel of sud-code from the digital TOC sinal is $20 indicating CD-ROM XA.

As a result of the decision, if optical disk 100 is CDG, CDG encoder 34 encodes 331 provided through DPS 33 from data reading section 31 and outputs a CDG signal 341 as screen displaying signal. Then, CDG signal 341 is outputted through switch 37 under of control section 38.

As a result of the decision, if optical disk 100 is audio CD, first D/A converter 35 analog-converts CD recording information signal 331 provided through DPS 33 from data reading section 31 and outputs analog-converted signal 351. Then, analog-converted signal 351 is outputted through switch 37 under of control section 38.

On the other hand, when control section 38 checks whether PSEC of A0 in Q channel of sud-code from the digital TOC sinal is $20, if the optical disc 100 is a V-CD, control section 38 control switch 37 switching path to be switched toward MPEG processing section 36, then optical pickup 313 executes playback operation using the PVD area in track 1.

That is, optical pickup 313 reads recorded data from the V-CD and outputs an audio/video data reading signal 314. Then, preamplifier 32 amplifies audio/video data reading signal 314 from optical pickup 313 and outputs an amplified signal 321. DSP 33 digital-processes amplified signal 321 from preamplifier 32 and outputs MPEG audio/video signals.

Subsequently, CD-ROM decoder 361 decodes MPEG audio/video signal 333 suitable for the CD-ROM data format and outputs the decoded MPEG signal 3611.

MPEG audio decoder 362 decodes MPEG audio signal 36111 of CD-ROM decoded MPEG signal 3611 through CD-ROM decoder 361 in accordance with the predetermined audio synchronous clock and outputs the decoded MPEG audio signal 3621. Second D/A converter 363 analog-converts decoded MPEG audio signal 3621 by MPEG audio decoder 361 and outputs analog-converted MPEG audio signal 3631 to be outputted through a sound output device (not shown).

Also, MPEG video decoder 364 decodes MPEG video signal 36112 of CD-ROM decoded MPEG signal 3611 through CD-ROM decoder 361 in accordance with the predetermined video synchronous clock and outputs the decoded MPEG video signal 3641. A video signal converter/ encoder 363 analog-converts decoded MPEG video signal 3641 from MPEG video decoder 364 as color signal of R (Red), G (Green), B (Blue) to be displayed on a CRT (not shown) and encodes it as an image displaying signal and outputs the analog-converted/encoded MPEG video signal 3651. Accordingly, analog-converted/encoded MPEG video signal 3651 is outputted through switch 37 to the CRT under control of control section 38.

A switch 37 switch between encoded CDG signal 341 from CDG encoder 34 and analog-converted/encoded MPEG video signal 3651 from MPEG processing section 36 to output a video signal for a displaying device, and switch between the audio CD signal 351 and CD-DA signal from first D/A converter 35 and the analog-converted MPEG audio signal 3631 from said MPEG processing section 36 to output an audio signal for a sound generation device.

Figure 4:
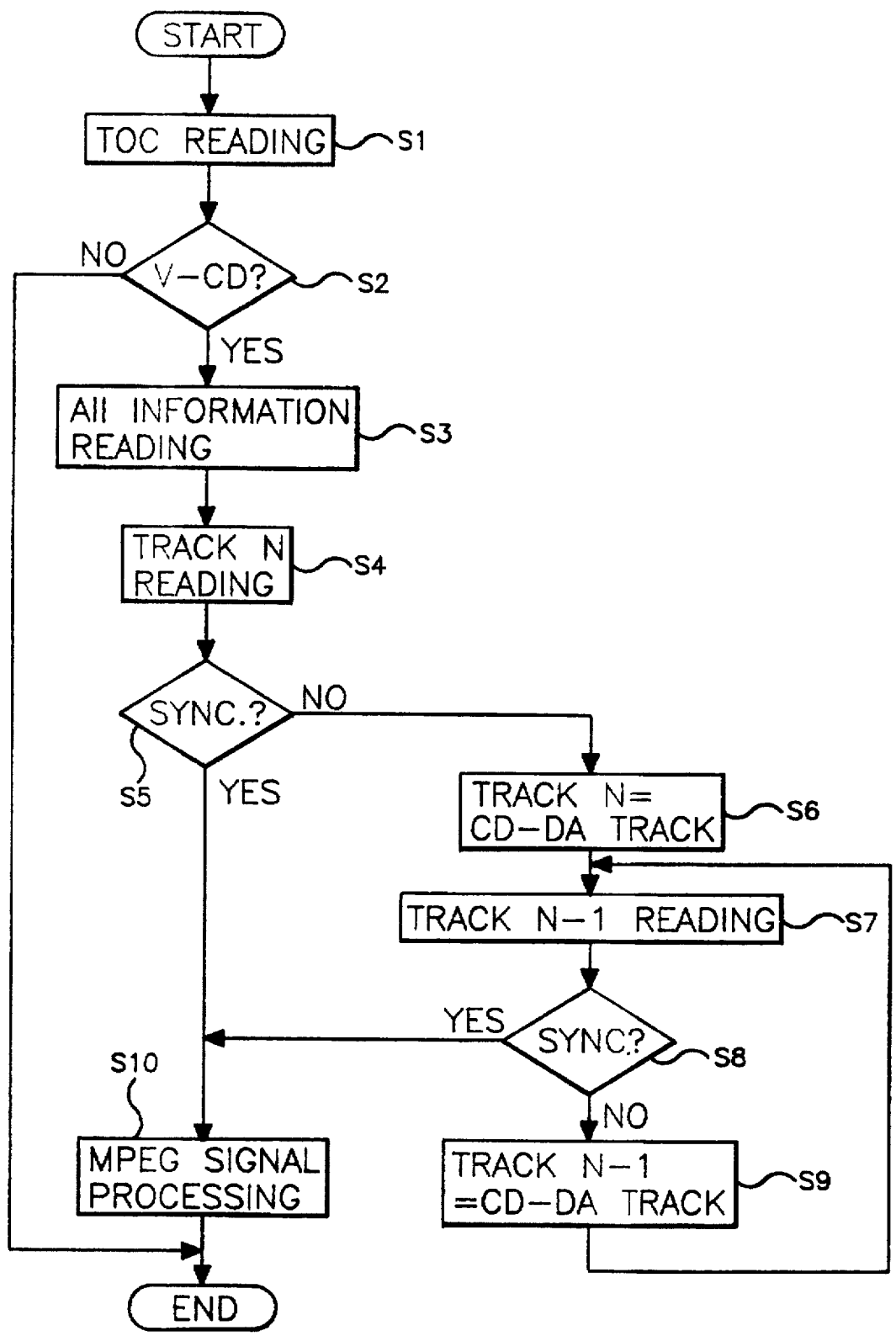
FIG. 4 is a flow chart for illustrating a different track researching method in a V-CD recording/reproducing system according to one embodiment of the present invention.

A description will be given below in detail, with reference to FIG. 4, the operation of a different track researching method for V-CD recording/reproducing system according to an embodiment of the present invention.

If optical disc 100 is loaded on V-CD recording/reproducing system 3 by user, optical pickup 313 reads TOC data recorded in a lead-in area of optical disc 100 under control of control section 38 at step S1.

Then control section 38 checks whether PSEC of A0 in Q channel of subcode from read TOC data is $20 indicating CD-ROM XA at step S2.

As a result of the decision at step S1, if PSEC of A0=$20, optical disc 100 is decided as V-CD and control section 38 recognizes information of V-CD on the basis of track number and track reproducing time information contained in the TOC data at step S3.

Subsequently, control section 38 moves optical pickup 313 to a final track of V-CD, that is track N, by controlling servo circuit 312, thereby optical pickup 313 reads data in recorded in the track N at step S4. According to it, the reader data are amplified by Rf amplifier 32 and processed by DSP 33.

Then control section 38 checks whether CD-ROM XA synchronous signal for V-CD is detected from RF sinal provided by DSP 33 at step S5.

As a result of the check at step S5, if CD-ROM XA synchronous signal for V-CD is detected from sinal provided by DSP, the track N is decided as the track on which MPEG audio/video information by MPEG processing are recorded. That is, the V-CD is decided on which CD-DA track is not included at step S10.

On the other hand, as a result of the check at step S5, if CD-ROM XA synchronous signal for a V-CD is not detected from RF sinal provided by DSP, the track N is decided as a CD-DA track (step S6), moves optical pickup 313 from track N to track N-1 of reading data (step S7), and checks whether a CD-ROM XA synchronous signal for V-CD is detected from track N-1 at step S8.

As a result of the check at step S8, if a CD-ROM XA synchronous signal for V-CD is detected from the track N-1, the track N-1 is decided a track on which MPEG audio/video information and thereby the V-CD is processed by MPEG processing section 34 at step S10. If a CD-ROM XA synchronous signal for V-CD is not detected from track N-1, the track N-1 is decided a CD-DA track (step S9) and returned to step S7. And then control section 38 reads information data from an inside track of track N-1, that is track N-2, and checks whether a CD-ROM XA synchronous signal for V-CD is detected from the track N-2 at step S8.

Then, control section 38 checks whether a CD-DA track is contained on the loaded V-CD. If the CD-DA track is contained, the CD-DA track is switched an output path of which from MPEG processing section 36 to first D/A converter 35 under the control of control section 38 to switch 37.

According to the present invention, in a V-CD recording/reproducing system, the different track method and apparatus decides what kind of disc is the loaded optical disc by reading TOC data recorded on lead-in of an optical disc, in case of V-CD, checks if a different track is contained in the V-CD such as CD-DA track in accordance with whether the synchronous signal for V-CD is detected easily. Therefore, the present invention may be used to reproduce not only an audio CD, a CDG, a V-CD but also a V-CD having a CD-DA track.

As described above, although illustrative embodiments of the present invention have been described in detail herein, it is to be understood that the invention is not limited to those precise embodiments, and that various changes and modifications may be effected herein by one skilled in the art without departing from the scope or spirit of the invention.

What is claimed is:

1. A method for searching a different track in a video compact disc recording/reproducing system using an optical pickup, said method comprising the steps of:

reading table-of-contents data recorded in a lead-in area of an optical disc which is loaded in the video compact disc recording/reproducing system;

deciding whether or not the optical disc is a video compact disc based on the read table-of-content data on the video compact disc, to read out information of video compact disc based on a track number and a track reproducing time information contained in the table-of-content data and to move the optical pickup to a final track in the video compact disc and read out data recorded on the final track, when the optical disc is the video compact disc; and deciding whether or not a CD-ROM XA synchronous signal for the video compact disc is detected in the read-out data from the final track, when the CD-ROM XA synchronous signal is detected, the final track is decided as a track on which MPEG audio/video signal are recorded by a MPEG processing and a processing audio/video signal against the video compact disc, and when the CD-ROM XA synchronous signal is not detected, the final track is decided as the different track so that the optical pickup is moved to an inside track of the final track to read out data recorded on the inside track; and deciding whether or not a CD-ROM XA synchronous signal for the video compact disc is detected in the read-out data from the inside track, when the CD-ROM XA synchronous signal is detected, the inside track is decided as a track on which MPEG audio/video signal are recorded by a MPEG processing and a processing audio/video signal against the video compact disc, and when the CD-ROM XA synchronous signal is not detected, the inside track is decided as the different track so that the optical pickup is moved to an inside track of the final track to return to the step reading out data recorded on the inside track.

2. An apparatus for searching a different track of a video compact disc, said apparatus comprising:

a data reading means for reading recorded information data from an optical disc which is loaded in a video compact disc recording/reproducing system, to output an audio/video data reading signal;

a preamplifier for amplifying the audio/video data reading signal which is supplied by the data reading means to output an amplified signal;

a digital signal processor for digital-processing the amplified signal from said preamplifier to output a first digital signal, a second digital signal, a third digital signal and a fourth digital signal;

a CDG encoder for encoding the first digital signal from said digital signal processor to output an encoded CDG signal;

a first D/A converter for converting the second digital signal and the fourth digital signal from said digital signal processor into a first analog signal and a second analog signal, respectively;

an MPEG processing section for processing the third digital signal from said digital signal processor by an MPEG algorism to output an MPEG audio/video signal;

a switch for switching between the CDG signal from said CDG encoder and the MPEG video signal from said MPEG processing section to output a video signal for a displaying device, and for switching between the first analog signal and the second analog signal from said first D/A converter and the MPEG audio signal from said MPEG processing section to output an audio signal for a sound generation device; and a control section for controlling an operation of said data reading means, said digital signal processor, said MPEG processing section and said switch, for discriminating a kind of the optical disc which is loaded based on table-of-content data of the optical disc, the table-of-content being supplied through the digital signal processor from said data reading means, and for searching whether the different track is allotted on the video compact disc according to whether or not a CD-ROM XA synchronous signal for the video compact disc is detected when the optical disc is the video compact disc.

3. The apparatus for searching a different track of a video compact disc as claimed in claim 2, wherein the first digital signal is a compact disc graphics signal, both the second digital signal and the first analog signal are an audio compact signal, the third digital signal is an MPEG audio/video signal for the video compact disc, the fourth digital signal and the second analog signal are a CD-DA track signal of the video compact disc.

* * * * *